F. LAMBERT.
JOINT.
APPLICATION FILED MAR. 13, 1915.
1,155,664.
Patented Oct. 5, 1915.
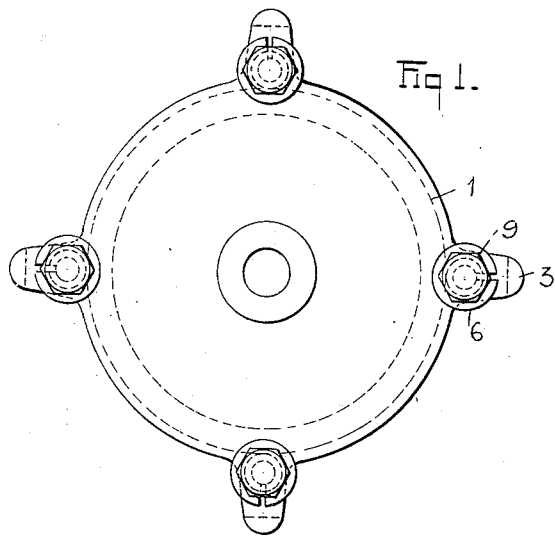
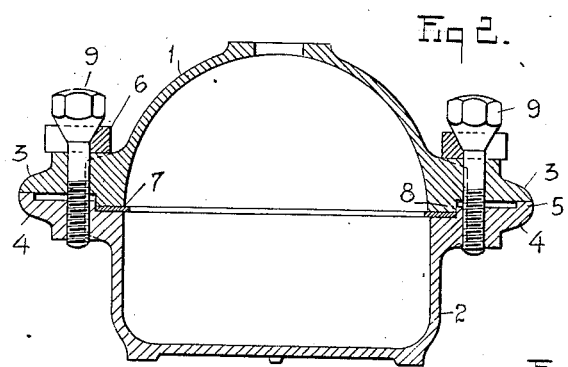
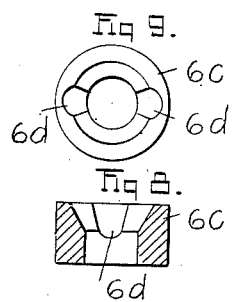
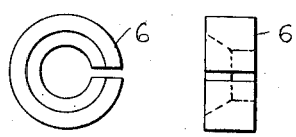
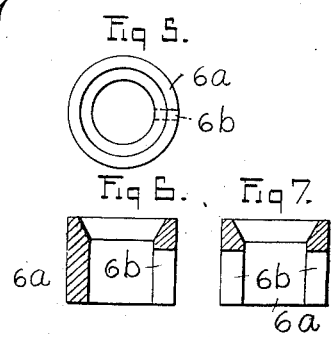
WITNESSES
INVENTOR
Frank Lambert
BY
ATTORNEYS

UNITED STATES PATENT OFFICE.

FRANK LAMBERT, OF NEW YORK, N. Y.

JOINT.

1,155,664. Specification of Letters Patent. Patented Oct. 5, 1915.

Application filed March 13, 1915. Serial No. 14,265.

*To all whom it may concern:*

Be it known that I, FRANK LAMBERT, a citizen of the United States of America, and a resident of the borough of Brooklyn, county of Kings, city and State of New York, have invented certain new and useful Improvements in Joints, of which the following is a specification.

My invention relates to improvements in joints, and is applicable to pipe connections and the like, but is particularly intended for joints of casing-members.

My invention comprises means whereby the joint may open, in case it be subjected to excessive pressure, without injury to the parts; also means whereby a relatively narrow and inexpensive gasket may be employed in the joint, and a tight joint obtained; also means whereby indication of the degree to which the screws connecting the joint members are set up is given.

My invention consists in the novel construction of the joint; in the novel means provided for indicating the extent to which the screws are set up, and other features, all as hereinafter described and particularly pointed out in the appended claims.

The objects of my invention are, to provide a simple and inexpensive joint construction which will allow opening of the joint in the event of development of excessive pressure, while maintaining a tight joint for ordinary or normal pressures; to avoid distortion or rupture of the principal members of the structure, in the event of such opening of the joint; and to make the entire construction simple, compact, and relatively inexpensive.

In the accompanying drawings I have illustrated my invention as applied to the casing of a fluid meter, but it will be understood that the invention is applicable to various other casings, and other articles, including pipe joints.

I will now proceed to describe my invention with reference to the accompanying drawings, and will then point out the novel features in claims.

Figure 1 shows a top view of a meter casing having a joint embodying my invention; Fig. 2 shows a central vertical section of the casing; Fig. 3 shows a top view, and Fig. 4 shows a side view, of one form of expansion washer which may be employed. Fig. 5 shows a top view and Fig. 6 a longitudinal section of an alternative form of expansion washer; and Fig. 7 is a longitudinal sectional view illustrating a modification of the form shown in Figs. 5 and 6. Fig. 8 shows a longitudinal section and Fig. 9 a top view of a still further form of expansion washer.

In the drawings 1 designates the upper section of a meter casing, and 2 the lower section thereof. These sections are provided, at suitable points around their peripheries, with registering lugs, 3 and 4 respectively, relieved from each other except near their outer ends. The lugs 4 of the lower section are provided with raised portions 5 adapted to contact with corresponding portions of the upper lugs 3. The lugs are bored for the reception of fastening screws 9; the screw holes of the lower lugs being tapped to receive these screws. The heads of these screws are conical on their under sides, and between such conical heads and the flat upper surfaces of the lugs 3, there are split washers 6, preferably formed of some material capable of expansion.

The lower section of the casing is recessed, below the main top surfaces of its lugs 4, to receive a gasket 7; while the upper section of the casing is provided with a circumferential projecting rib 8 to engage such recess and rest on the gasket. The top faces of the raised portions 5 are elevated to such extent above the main portion of the top faces of the corresponding lugs 4 as to insure that, when the upper casing member 1 is pressed down upon the gasket 7, the material of such gasket shall be compressed to some predetermined degree, say ten thousandths of an inch, before the faces of the lugs 3 contact with the faces of such raised portions 5. This insures a considerable degree of compression of the gasket before there is any material tendency for the pressure of the screws 9 to cause flexure of the lugs 3 and 4. Once the faces of lugs 3 and raised portions 5 have contacted, further pressure exerted by means of the screws 9 tends to cause inward flexure of the lugs 3 and 4, *i. e.*, flexure about the contacting points of lugs 3 and raised portions 5 as fulcra; and it will be apparent that, since these fulcra points are at the extreme outer ends of the lugs 3 and 4, great pressure may be exerted upon the gasket without material deformation of the lugs. In case of development of undue pressure within the casing, the washers 6 will begin to yield slightly, permitting slight opening of the joint between the casing members, and so affording temporarily relief from the excessive pressure; and such relief will be obtained without breakage of any of the parts, or, at the most, with breakage or opening of one or more of the washers 6, and without damage to the casing. Furthermore, such opening of the joint will, in general, be accomplished without any permanent flexure of the lugs 3 and 4, the motion of one or the other of the casing members incident to the opening of the joint, tending to remove such slight flexure if any, of the lugs 3 and 4, as may have existed previously, due to pressure exerted by the screws 9 upon said lugs at points within the fulcra points of the lugs.

In practice, when tightening up the joint, the screws 9 are turned up until, through the expansion of the washers 6 by the conical heads of such screws, a predetermined degree of separation of the jaws of said washers is obtained.

Various forms of split or otherwise yielding washers, or "yield-members" as such washers may properly be termed, may be employed. In Figs. 5 and 6 I illustrate a yield-member 6ᵃ having a slot 6ᵇ extending nearly, but not quite, through the washer; and in Fig. 7 I illustrate a similar construction wherein a plurality of such slots 6ᵇ are provided. In the event of development of excessive pressures, the member 6ᵃ, as shown in Figs. 5, 6 and 7, will break. In Figs. 8 and 9 I illustrate a further construction, wherein a washer 6ᶜ, preferably conically-bored, has recesses 6ᵈ provided at diametrically opposite points in the conical portion of its bore; as a result, the pressure of the conical head of the screw or bolt 9 will be exerted, upon the washer 6ᶜ, mainly in diametrically opposite directions; and in the event of development of excessive pressure, the member 6ᶜ will yield, either by stretching or by breaking, in these diametrically opposite directions; breakage, if it occurs, occurring through the recesses 6ᵈ. It will be apparent, however, that various other forms of yield members may be employed, and I do not limit myself to the particular forms shown, although I regard these as convenient.

It will be apparent that, in the opening of the joint under excessive pressure, the lugs of the casing members flex about their points of engagement, at their outer extremities, as fulcra; the screws being located well inside these fulcra points, it is clear that the screws are located particularly advantageously for resisting the pressure tending to open the joint without deformation of the casing members.

I am aware that it is common to provide casing members and the like with projecting lugs containing holes through which bolts, screws or the like are passed to hold the casing members together; but in such former constructions, so far as I am aware, the fulcra points are inside the bolts or screws; for example, are usually about where the gasket is located in my construction. In such former constructions, therefore, the screws or bolts act upon much shorter lever arms than in my construction, and in case excessive pressure develops, such as will open the joint, the lugs are often bent or broken, or the screws or bolts themselves are bent or broken. But in my construction, since the fulcra points are at the extreme outer ends of the lugs, and since the split washers are provided, opening of the joint may occur without any great flexure of the lugs or distortion of the casing, and therefore without permanent distortion of either the lugs or the casing.

What I claim is:—

1. The combination with two joint members having integral projecting lugs provided with fulcra points near their outer ends, said joint members adapted to receive between them a gasket having a thickness such that, when such joint members are drawn together, said gasket will be compressed before such fulcra points contact, of means, located between the position for the inner edge of said gasket and said fulcra points, for drawing the joint members together and holding them together.

2. The combination with two joint members having projecting lugs provided with fulcra points near their outer ends, of means, located within such fulcra points, for holding the joint members together, and comprising expansible members and means causing expansion of such members in the event of separation of the joint members.

3. The combination with a plurality of joint members, of means for holding such joint members together comprising a fastening member and a coacting expansible member one of which two members has a tapering surface engaging a surface of the other of such coacting members whereby, upon increase in pressure above a predetermined degree said expansible member will expand.

4. The combination with a plurality of joint members, of means for holding such members together comprising fastening members having conical surfaces, and yield members engaging the conical surfaces of such fastening members and arranged to be expanded by pressure produced by such fastening members.

5. The combination with joint members having projecting lugs provided with fulcra points near their outer ends, of means, located well within such fulcra points, for holding such joint members together, and comprising fastening means consisting of coacting fastening members and a yield member; one of said coacting members comprising a conical surface engaging the other coacting member and arranged to cause expansion of such yield member upon the occurrence of pressure exceeding a predetermined amount.

6. The combination with joint members having projecting lugs provided with fulcra points near their outer ends, of means located well within such fulcra points for holding such joint members together, comprising fastening members having conical surfaces, and split washers engaging the said conical surfaces of said fastening members and arranged to be expanded by the pressure produced by such fastening members.

7. The combination of two joint members having projecting lugs provided with fulcra points near their outer ends, and fastening means located within such fulcra points, for holding the joint members together, one of said joint members having, inside of the zone of said fastening means, a gasket recess, the bottom of which is at a lower level than the fulcra surfaces of the lugs of that member, the other of said joint members having a corresponding gasket-projection, said projection and recess adapted for the compression of a gasket between them.

8. The combination of two joint members having projecting lugs provided with fulcra points near their outer ends, fastening means, located within such fulcra points, for holding the joint members together, and a gasket arranged to be gripped between such joint members and of a thickness such that, when the joint members are drawn together, such gasket is compressed to a considerable extent before the fulcra points of said lugs contact; whereby as said joint members are drawn together the tendency is first for flexure of said lugs about the gasket as a fulcrum, and afterward when the fulcra points of said lugs have come together, the tendency is for the flexure of the lugs in the opposite direction, and about such fulcra points as fulcra.

9. A yield-member for joints comprising a washer having a conical bore, such washer weakened at one or more points to facilitate yielding of the washer under pressure applied to the conical surface of its bore.

10. A yield-member for joints comprising a washer having a conical bore, such washer weakened at one or more points to facilitate yielding of the washer under pressure applied to the conical surface of its bore in the direction of the axis of the bore of the washer.

11. The combination with two joint members, of means for connecting said members comprising fastening members having taper surfaces and yield-members engaging the taper portions of such fastening members.

12. The combination with two joint members having projecting lugs, of means engaging said lugs and tending to hold the joint members together and comprising fastening means having taper surfaces and yield members engaging the taper surfaces of such fastening means.

In testimony whereof I have signed this specification in the presence of two subscribing witnesses.

FRANK LAMBERT.

Witnesses:
H. M. MARBLE,
D. A. DAVIES.